(12) United States Patent
Ashley

(10) Patent No.: US 6,385,234 B1
(45) Date of Patent: May 7, 2002

(54) TRANSCEIVER CIRCUIT AND METHOD

(75) Inventor: Francis R. Ashley, South Plainfield, NJ (US)

(73) Assignee: Globespan Virata, Inc., Red Bank, NJ (US)

( * ) Notice: Subject to any disclaimer, the term of this patent is extended or adjusted under 35 U.S.C. 154(b) by 0 days.

(21) Appl. No.: 09/127,414

(22) Filed: Jul. 31, 1998

(51) Int. Cl.[7] .................................................. H04B 1/38
(52) U.S. Cl. ........................................................ 375/219
(58) Field of Search ................................. 375/219, 222; 330/51, 144; 379/93.01

(56) References Cited

U.S. PATENT DOCUMENTS

| | | | |
|---|---|---|---|
| 4,024,463 A | * 5/1977 | Pelley | 330/138 |
| 4,302,629 A | * 11/1981 | Foulkes et al. | 370/483 |
| 5,697,081 A | * 12/1997 | Lyall, Jr. et al. | 375/345 |
| 5,796,303 A | * 8/1998 | Vinn et al. | 330/51 |

* cited by examiner

Primary Examiner—Tesfaldet Bocure
Assistant Examiner—Kevin M Burd
(74) Attorney, Agent, or Firm—Thomas, Kayden, Horstemeyer & Risley

(57) ABSTRACT

A modem transceiver circuit and method is disclosed, the transceiver circuit having a line drive transformer, a transmit circuit and a receive circuit. The receive circuit features a receive operational amplifier which is enabled when the voltage magnitude of a data signal received by the modem transceiver circuit is below a predetermined threshold. The receive operational amplifier is disabled when the voltage magnitude of the data signal is greater than or equal to the predetermined threshold. When enabled, the receive operational amplifier amplifies the data signal for further processing by other modem circuitry. When disabled, a series resistance comprising an input resistance and a feedback resistance attenuates the data signal for further processing by other modem circuitry.

6 Claims, 4 Drawing Sheets

TRANSCEIVER CIRCUIT AND METHOD

FIELD OF THE INVENTION

This invention relates to the field of data communications, and in particular, circuits for transmitting and receiving a data signal on a local loop.

BACKGROUND OF THE INVENTION

Digital subscriber line (DSL) technology is often used to facilitate data communications at relatively high data rates over a local loop between a telephone central office and a customer premise. In a typical configuration, a DSL modem is placed at the customer premises and communicates with a corresponding DSL modem at the central office. From the central office, the data signal is routed to a destination DSL modem through a digital network.

It is often the case that the local loop, which generally comprises a two wire pair, extends up to 18,000 feet from the central office to the customer premises. It is desirable that the DSL modems operate reliably over such long local loops.

To address this concern, the central office will often transmit a data signal to the customer premises of relatively high peak-to-peak voltage to ensure that the DSL modem at the customer premises receives a signal of adequate strength for demodulation to recreate the data signal transmitted. In fact, a typical central office line drive amplifier is designed to transmit a signal of up to 35 volts peak-to-peak across the local loop to the DSL modem at the customer premises.

Generally, this signal is attenuated significantly in local loops of significant length before reaching the DSL modem at the customer premises. Accordingly, the typical receive circuitry of DSL modems used at the customer premises is designed with the assumption that the data signal transmitted by the central office will be attenuated over the local loop. However, where a local loop is short in length due to the relatively close proximity of the customer premises to a central office, the 35 volt peak-to-peak signal is often clipped in the receive circuitry of the DSL modem located at the customer premises, as the receive circuitry was designed for lower voltage levels due to the attenuation in the local loop.

One solution to the unwanted clipping problem involves attenuating the central office data signal at the central office. However, the central office data signal may be attenuated generally by no more than 6dB due to cross talk noise considerations which leaves a peak-to-peak voltage of 17.5 volts. In the case where the local loop presents no significant attenuation of the central office data signal, a peak-to-peak voltage of 17.5 volts still causes clipping in the receive circuitry of the DSL modem located at the customer premises. Transmission of a data signal from the central office at a lower voltage to avoid the clipping problem is unfeasible as cross talk may cause too high a signal to noise ratio (SNR) for proper operation.

A second solution is to introduce attenuation circuitry between the local loop and the receive circuitry in the DSL modem that performs an attenuation function. This attenuation circuitry is best placed in the DSL modem at the local loop connection. Generally, this attenuation circuitry achieves the attenuation function by switching resistors in series with the amplifier input resistors with a complementary metal-oxide semiconductor (CMOS) analog switch. Unfortunately, one problem with this approach is that CMOS switches have increased "on" state resistance when powered at low voltage, such as the +5 volt single rail power supply usually used in the transceiver of a customer premises DSL modem. This "on" state resistance degrades performance in the unattenuated mode of the receiver. CMOS switches also present further disadvantages in that they are costly and require a circuit of greater physical size.

Consequently, there is a need for a transceiver circuit in a customer premises DSL modem to provide attenuation of a data signal transmitted from a central office over a local loop of minimal length, without additional cost and circuit size. Also, it is desirable that such a circuit avoid the introduction of unwanted resistance, etc.

SUMMARY OF THE INVENTION

The present invention is an economical transceiver circuit and method that for the attenuation of a downstream data signal transmitted from either a central office or a customer premise over a local loop of minimal length. The present invention may also be employed where the local loop is of sufficient length that additional attenuation is not needed.

Accordingly, the transceiver circuit of the present invention is placed in a modem and is comprised of a line drive transformer, a transmission circuit coupled to the line drive transformer, and a receive circuit coupled to the line drive transformer. The transmission circuit and the receive circuit are coupled to a primary winding of the line drive transformer and a secondary winding of the line drive transformer is coupled to a local loop at the central office or the customer premises. The receive circuit features an amplified signal pathway defined by a summing circuit having a receive operational amplifier coupled to a first input resistance and a feedback resistance. The amplified signal pathway is employed when the downstream data signal does not require attenuation (e.g. where the local loop is of significant length). In such cases, the amplified signal pathway amplifies the downstream data signal for further processing by the modem. This is accomplished by placing the receive operational amplifier is an active state. The receive circuit also features an attenuated signal pathway defined by the first input resistance in series with the feedback resistance. The series resistance is instituted by placing the receive operational amplifier in an inactive state. The series resistance attenuates the downstream data signal input for further processing by the modem.

In accordance with one aspect of the present invention, a method is provided for receiving a downstream data signal in a transceiver circuit of a modem. The method includes the steps of coupling a transmit circuit to primary winding in a line drive transformer, coupling a receive circuit to the primary winding, and coupling a secondary winding of the line drive transformer to a local loop. Next, the method includes the step of amplifying an downstream data signal with an amplifier having a first input resistance and a feedback resistance in the receive circuit, when the voltage level of the downstream data signal is below a predetermined threshold. The final step involves attenuating the downstream data signal with a series resistance comprising the first input resistance and the feedback resistance, the amplifier being disabled when the voltage level is greater than or equal to the predetermined threshold.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
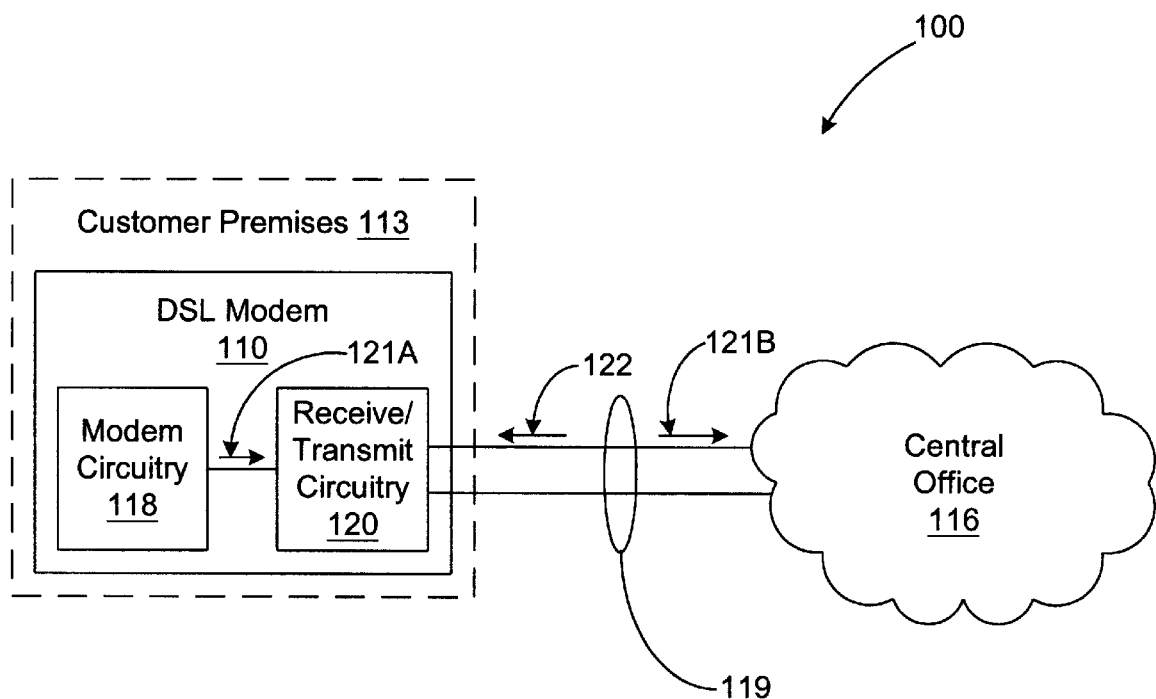
FIG. 1 is a block diagram of a data communications network over a local loop using a digital subscriber line modem.

Turning to FIG. 1, shown is a data communications network 100 in which a digital subscriber line (DSL) modem 110 located on a customer premise 113 is electrically coupled to a central office 116 using a two wire pair or local loop 119. The DSL modem 110 is electrically coupled to the local loop 119 through a transceiver circuit 120. The transceiver circuit 120 is in turn coupled to modem circuitry 118. An upstream data signal 121A is generated by the DSL modem 110 in the modem circuitry 118 and is transmitted as an upstream data signal 121B across the local loop 119 to the central office 116. Likewise, a downstream data signal 122 is generated at the central office 116 and is transmitted across the local loop 119 to the DSL modem 110 at the customer premises 113. In DSL applications, generally the upstream data traffic occupies a frequency range from approximately 35 kilohertz to 200 kilohertz, and the downstream data traffic occupies a frequency range from approximately 250 kilohert to 1 megahertz.

Note that although this discussion assumes the transceiver circuit 120 is located in the DSL modem 110 at the customer premises 113, this configuration is an example as the transceiver circuit 120 may also be located at the central office 116 to attenuate an upstream data signal 121B if necessary. That is to say that, ultimately, the upstream data signal 121B is defined as that which is transmitted from the transceiver circuit 120 and the downstream signal 122 is defined as that which is received by the transceiver circuit 120. The discussion herein assumes the transceiver circuit 120 is located in the DSL modem 110 at the customer premises 113 as an example in order to facilitate the understanding of the present invention as discussed herein.

The local loop 119 may differ in length depending upon how far the customer premises 113 is away from the central office 116. For local loops 119 of relatively long lengths, such as approximately 2000 feet or greater, for example, the local loop 119 significantly attenuates the downstream data signal by virtue of the impedance of the local loop 119 itself. However, where the local loop 119 is relatively short in length, then the downstream data signal received at the customer premises 113 is typically large and is subject to clipping in conventional transceiver circuitry, unless some attenuation is introduced in the signal pathway.

Figure 2:
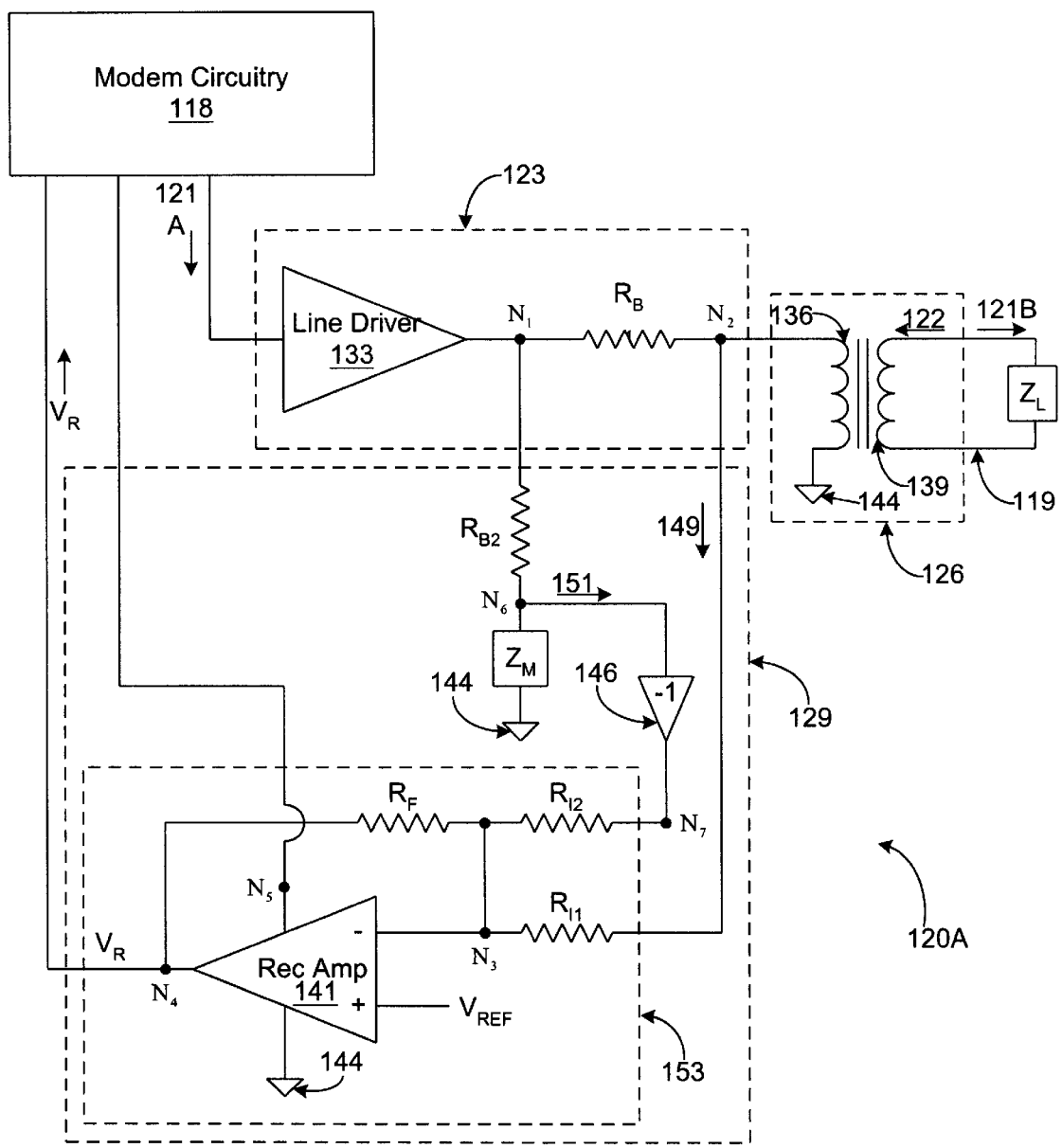
FIG. 2 is a schematic of a transceiver circuit of the digital subscriber line modem of FIG. 1 according to a preferred embodiment of the present invention.

With this in mind, reference is made to FIG. 2 which is a schematic of a single ended transceiver circuit 120A according to the present invention. The single ended transceiver circuit 120A comprises a transmit circuit 123, a line drive transformer 126, and a receive circuit 129. The transmit circuit 123 receives an upstream data signal 121A from the modem circuitry 118. The upstream data signal 121A is applied to the input of a line driver amplifier 133. The line driver amplifier output is coupled to a back matching resistance $R_{B1}$ at node $N_1$. The back matching resistance $R_{B1}$ in turn is coupled to a primary winding 136 of the line drive transformer 126 at node $N_2$.

The line drive transformer 126 also includes a secondary winding 139 that is coupled to a local loop 119. The local loop impedance $Z_L$ represents the impedance presented to the customer premises 113 by the local loop 119 and the central office 116 (FIG. 1).

The receive circuit 129 features a receive operational amplifier 141 with a negative input coupled to a first input resistance $R_{I1}$ at node $N_3$. The first input resistance $R_{I1}$ in turn is coupled to the output of the transmit circuit 123 at node $N_2$. Also coupled to the negative input of the receive operational amplifier 141 at node $N_3$ is a feedback resistance $R_F$. The feedback resistance $R_F$ in turn is coupled to the output of the receive operational amplifier 141 at node $N_4$. A reference voltage $V_{REF}$ is coupled to the positive input of the receive operational amplifier 141, and the ground terminal of the receive operational amplifier is attached to ground 144.

The receive operational amplifier 141 also features an enable/disable input connected to the modem circuitry 118 at node $N_5$. When disabled, the inputs and outputs of the receive operational amplifier 141 are in a high impedance state. Note that the modem circuitry 118 applies a voltage to the enable/disable input of the receive operational amplifier 141. In the preferred embodiment, the modem circuitry 118 accomplishes this using a digital signal processor operating pursuant to operating logic stored on a memory that generates an output signal that is applied to the enable/disable input of the receive operational amplifier 141. Note, however, that some other decision circuit may be employed instead of the digital signal processor such as, for example, a circuit which includes a switch, transistor, or other logical device.

Note that the enable/disable input may also be the power source of the receive operation amplifier 141. In such a case, the output signal of the modem circuitry 118 would actually power the receive operational amplifier 141 on or off.

The receive circuit 129 also features a matching resistance $R_{B2}$ which is electrically coupled to the output of the line driver amplifier 133 at node $N_1$. The opposite end of the matching resistance $R_{B2}$ is electrically coupled to a matching impedance $Z_M$ at node $N_6$ which, in turn, is electrically coupled to ground 144. An input of an inverter 146 is electrically coupled to the matching resistance $R_{B2}$ and the matching impedance $Z_M$ at node $N_6$. The output of the inverter 146 is electrically coupled to a second input resistance $R_{I2}$ at node $N_7$. The second input resistance $R_{I2}$ is, in turn, electrically coupled to the negative input of the receive operational amplifier 141 at node $N_3$.

Having described the physical connectivity of the transceiver circuit 120A the operation of the transceiver circuit 120A will now be discussed. The upstream data signal 121A generated by the modem circuitry 118 is amplified by the line driver amplifier 133 and sent to the primary winding 136 of the line drive transformer 126. The upstream data signal 121A is then magnetically coupled to the secondary winding 139 of the line drive transformer 126 and transmitted across the local loop 119 to the central office 116 as a transmitted upstream data signal 121B.

A downstream data signal 122 is transmitted from the central office 116 over the local loop 119 to the secondary winding 139 of the line drive transformer 126. The line drive transformer 126 magnetically couples the downstream data signal 122 to the primary winding 136. Thus, at node $N_2$, both the upstream and downstream data signals 121A and 122 are present, the combination of which is referred to herein as the combined signal 149.

The operation of the receive circuit 129 comprises two different states. First, there is an attenuation state which is instituted when the magnitude of the voltage of the downstream data signal 122 is above a predetermined threshold. Second, there is an amplification state which is instituted when the magnitude of the voltage of the downstream data signal 122 is below or equal to the predetermined threshold. The predetermined threshold voltage level is one that results in an output voltage $V_R$ of approximately 3 volts peak-to-peak, but may be greater or lesser depending upon the specific application and the operating ranges of the circuit components employed as described herein.

The modem circuitry 118 determines whether the magnitude of the downstream signal 122 is above, or below or equal to the predetermined threshold by examining the output voltage $V_R$. Specifically, in the preferred embodiment, the output voltage $V_R$ is coupled to an analog to digital (A/D) converter in the modem circuitry 118 which in turn supplies a digitized output voltage $V_R$ to the digital signal processor which compares the output voltage $V_R$ to the predetermined threshold pursuant to operating logic stored on the memory in the modem circuitry 118. When the output voltage $V_R$ is below the predetermined threshold, the modem circuitry 118 applies an enable voltage signal to node $N_5$ which enables or turns on the receive operational amplifier 141 and the transceiver circuit 120A operates in the amplification state. When the output voltage $V_R$ is above or equal to the predetermined threshold, the modem circuitry 118 does not apply an enable voltage signal to node $N_5$, which disables the receive operational amplifier 141 and the transceiver circuit 120A operates in the attenuation state.

The operation of the receive circuit 129 while in the amplification state is as follows. The upstream data signal 121A is transmitted through the matching resistance $R_{B2}$ and the matching impedance $Z_M$. The matching impedance $Z_M$ is a scaled version of the impedance presented by the line drive transformer 126 from node $N_2$ to ground 144. The scaling factor is substantially equal to the ratio of $R_{B2}/R_{B1}$ which may be for example, a factor of 10. This factor ensures that the matching resistance $R_{B2}$ does not draw too much current from the line driver amplifier 133. This scaling factor results in a matching upstream data signal 151 at node $N_6$ with a magnitude equal to the magnitude of the upstream data signal portion of the combined signal 149 at node $N_2$. The combined signal 149 is coupled to the negative terminal of the receive operational amplifier 141 at node $N_3$ via the first input resistance $R_{f1}$. The matching upstream data signal 151 is then inverted by the inverter 146 and coupled to the negative terminal of the receive operational amplifier 141 at node $N_3$.

The modem circuitry 118 applies a voltage to the enable/disable input of the receive operational amplifier 141, thereby activating the receive operational amplifier 141. In the receive circuit 129, the active receive operational amplifier 141 together with the first and second input resistances $R_{f1}$ and $R_{f2}$, and the feed back resistance $R_F$ become a summing circuit 153. This summing circuit 153 acts to add the signal inputs at nodes $N_7$ and $N_2$, which are the inverted matching upstream data signal 151 and the combined signal 149. The result is that the upstream data signal 121A is subtracted from the combined signal 149, leaving the downstream data signal 122 to be amplified by the receive operational amplifier 141. Thus, the summing circuit 153 acts as a first signal pathway for the downstream data signal 122 when the receive operational amplifier 141 is active. The output of the receive operational amplifier 141 is the amplified downstream data signal 122 with an output voltage level VR which is coupled to the modem circuitry 118 for further processing.

The operation of the receive circuit 129 while in the attenuation state is as follows. First, the modem circuitry 118 does not apply a voltage to the enable/disable input of the receive operational amplifier 141 so that the receive operational amplifier 141 is disabled. The negative input of the receive operational amplifier 141 then presents a near infinite resistance. Also, the output of the inverter 146 also presents a near infinite resistance. Consequently, the combined signal 149 follows the path of least resistance from node $N_2$ to the receive circuit 129 output at node $N_4$ through a series resistance presented by the first input resistance $R_{f1}$ and the feedback resistance $R_F$. This series resistance attenuates the combined signal by up to approximately 30 dB, depending upon the values chosen for the first input resistance $R_{f1}$ and the feedback resistance $R_F$. Thus, the receive circuit 129 provides an attenuated signal pathway through the series resistance of the first input resistance $R_{f1}$ and the feedback resistance $R_F$.

Note that the upstream data signal portion of the combined signal 149 is also attenuated by the series resistance of the first input resistance $R_{f1}$ and the feedback resistance $R_F$. In addition, the inverted matching upstream data signal 151 passes through the series resistance presented by the second input resistance $R_{f2}$ and the feedback resistance $R_F$. Note that these upstream signals are not subtracted from each other when the receive operational amplifier 141 is disabled. However, this does not present a problem since frequency division multiplexing is employed in which the upstream and downstream data signals are in different frequency bands and the upstream signals can be filtered out of the signal using filters in the modem circuitry 118. Consequently, the attenuation provided by the first and second input resistances $R_{f1}$ and $R_{f2}$ in series with the feedback resistance $R_F$ serves to diminish these upstream signals so that they present minimal interference.

Figure 3:
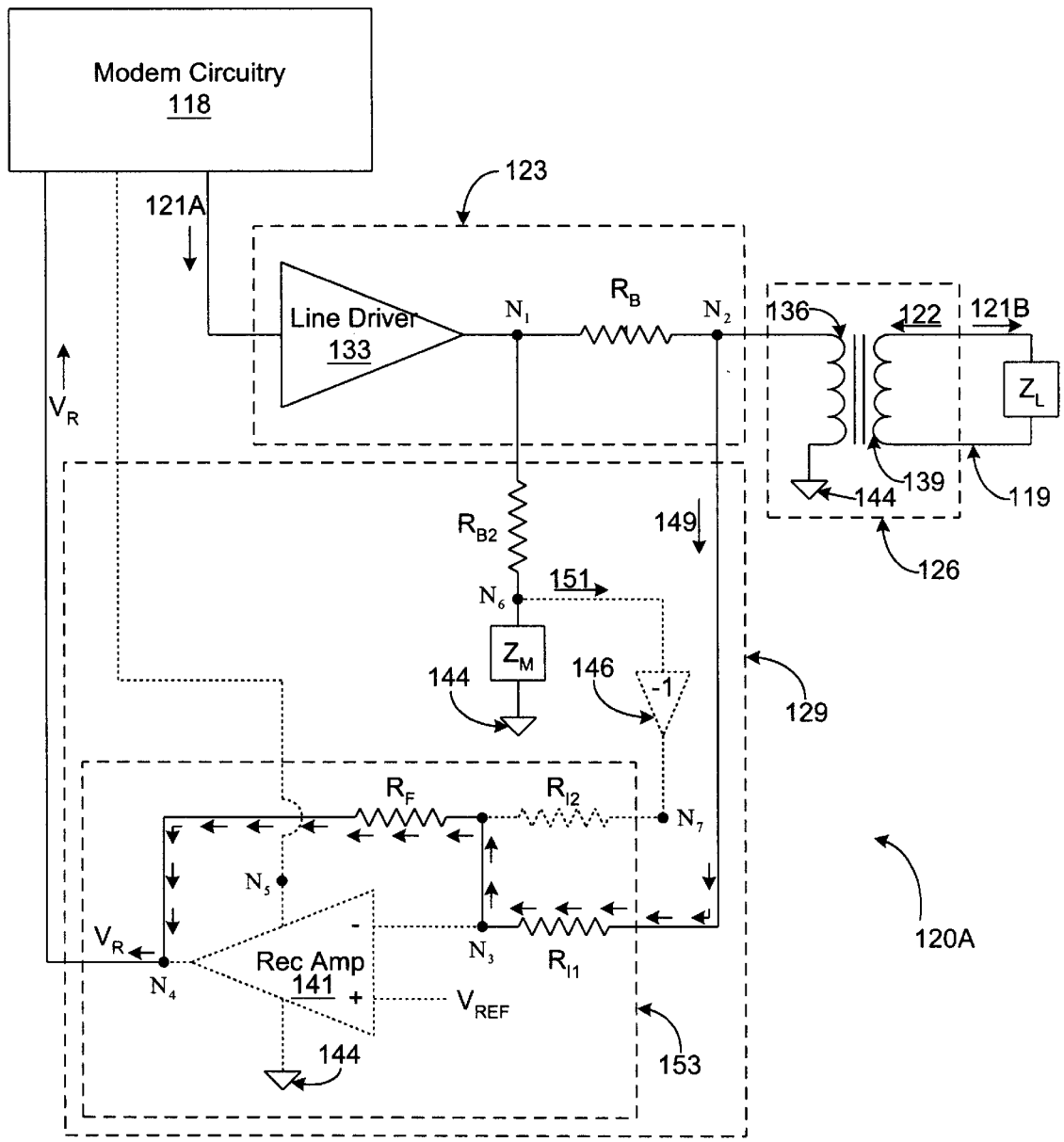
FIG. 3 is a schematic of the transceiver circuit of FIG. 2 further showing an attenuated signal pathway.

Turning to FIG. 3, shown is the schematic of the transceiver circuit 120A which further illustrates the attenuated signal pathway through the series resistance of the first input resistance $R_{f1}$ and the feedback resistance $R_F$. Note that the receive operational amplifier 141, the inverter 146, and the second input resistance $R_{f2}$ present infinite resistance such that the attenuated signal pathway is the only remaining route followed by the combined signal 149.

Figure 4:
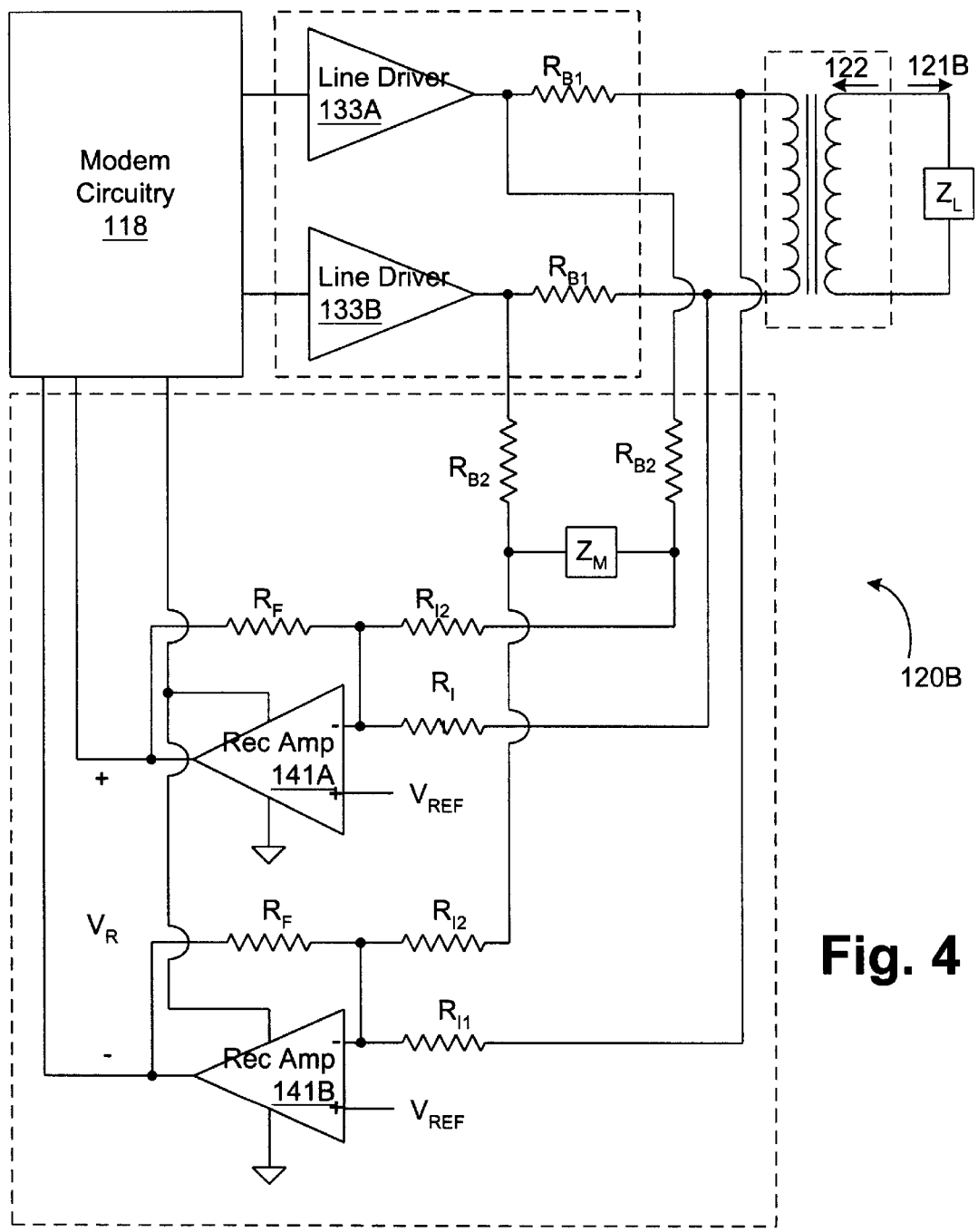
FIG. 4 is a schematic of the transceiver circuit of FIG. 2 using a balanced circuit design for low noise operation, according to an alternative embodiment of the present invention.

Referring now to FIG. 4, shown is a schematic of a transceiver circuit 120B according to a second embodiment of the present invention. The transceiver circuit 120B is essentially the transceiver circuit 120A in a balanced circuit configuration.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, it is claimed:

1. A transceiver circuit in a modem, comprising:
   a transformer means for interfacing the transceiver circuit with a local loop;
   a transmission means for transmitting an upstream data signal, the transmission means being coupled to the transformer means;
   a receive means for receiving an downstream data signal, the receive means being coupled to the transformer means, the receive means including:
   an amplification means for amplifying the downstream data signal when the voltage level of the downstream data signal is less than a predetermined threshold;
   a means for activating and deactivating the amplification means; and
   an attenuating means for attenuating the downstream data signal when the voltage level of the downstream data signal is greater than a predetermined threshold, the attenuating means being operative when the amplification means is deactivated.

2. The transceiver circuit of claim 1, wherein
   the amplification means further comprises a summing circuit having a receive operational amplifier, a feedback resistance, and an input resistance; and
   the attenuating means further comprises the feedback resistance in series with the input resistance.

3. The transceiver circuit of claim 2, wherein the receive means further comprises a transmission signal subtraction circuit coupling the transmission means to the summing circuit.

4. The transceiver circuit of claim 1, further comprising measuring means for determining whether the voltage of the downstream data signal received by the transceiver circuit is greater than a predetermined threshold.

5. The transceiver circuit of claim 4, further comprising means for triggering the activation/deactivation means responsive to the measuring means.

6. The transceiver circuit of claim 5, wherein the means for triggering the activation/deactivation means is a switch.

* * * * *